United States Patent
Khan

(10) Patent No.: US 10,396,946 B2
(45) Date of Patent: Aug. 27, 2019

(54) METHODS AND SYSTEMS FOR ASYNCHRONOUS TIME DIVISION DUPLEX BY RADIO BASE STATION

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 15 days.

(21) Appl. No.: 15/811,580

(22) Filed: Nov. 13, 2017

(65) Prior Publication Data

US 2019/0149281 A1 May 16, 2019

(51) Int. Cl.
*H04L 5/00* (2006.01)
*H04W 72/04* (2009.01)
*H04L 5/14* (2006.01)

(52) U.S. Cl.
CPC .......... *H04L 5/0007* (2013.01); *H04L 5/0032* (2013.01); *H04L 5/143* (2013.01); *H04W 72/0446* (2013.01)

(58) Field of Classification Search
CPC ......... H04L 5/001; H04L 5/14; H04L 5/1469; H04L 1/1812; H04L 27/2602; H04L 5/0007; H04L 5/003; H04L 1/0031; H04W 72/0446; H04W 72/042; H04W 72/04; H04W 72/0453; H04W 72/1289; H04W 28/0236; H04W 48/12; H04W 72/0406; H04W 72/0413; H04W 72/1278; H04W 72/1294
See application file for complete search history.

(56) References Cited

U.S. PATENT DOCUMENTS

| | | | | |
|---|---|---|---|---|
| 2014/0064216 A1* | 3/2014 | Agiwal | ............... | H04L 1/0031 370/329 |
| 2014/0071961 A1* | 3/2014 | Nigam | ............... | H04W 72/042 370/336 |
| 2014/0321375 A1* | 10/2014 | Agiwal | ............... | H04W 56/001 370/329 |
| 2015/0215082 A1* | 7/2015 | Agiwal | ............... | H04L 1/1822 370/336 |
| 2015/0270932 A1* | 9/2015 | Agiwal | ............... | H04L 1/1887 370/336 |
| 2015/0282178 A1* | 10/2015 | Kim | ............... | H04B 7/2656 370/329 |
| 2016/0020891 A1* | 1/2016 | Jung | ............... | H04L 5/0064 370/280 |
| 2016/0119948 A1* | 4/2016 | Damnjanovic | ....... | H04L 1/1812 370/280 |
| 2016/0226650 A1* | 8/2016 | Chen | ............... | H04L 5/14 |
| 2018/0035446 A1* | 2/2018 | Li | ............... | H04L 5/14 |
| 2018/0063820 A1* | 3/2018 | Xiong | ............... | H04W 72/042 |
| 2018/0279388 A1* | 9/2018 | Miao | ............... | H04W 76/10 |

* cited by examiner

*Primary Examiner* — Sai Aung
(74) *Attorney, Agent, or Firm* — Michael A. Rahman

(57) ABSTRACT

A method of wireless communication using time division duplex over widely spaced frequency bands by a radio base station includes transmitting millimeter wave band downlink signals comprising a plurality of first transmission time intervals (TTIs) and receiving millimeter wave band uplink signals comprising at least one second TTI. The number of first TTIs is greater than the number of second TTIs. The method includes transmitting sub-7 GHz band downlink signals comprising at least one third TTI and receiving sub-7 GHz band uplink signals comprising a plurality of fourth TTIs. The number of third TTIs is less than the number of fourth TTIs.

23 Claims, 12 Drawing Sheets

METHODS AND SYSTEMS FOR ASYNCHRONOUS TIME DIVISION DUPLEX BY RADIO BASE STATION

BACKGROUND

The invention relates to wireless communications, and in particular relates to methods and systems for asynchronous time division duplex by radio base stations.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications. In the millimeter wave bands above 24 GHz, a time division duplexing (TDD) scheme is generally preferred. However, regulations in most parts of the World allow using other duplexing schemes including frequency division duplexing (FDD).

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |

TABLE 1-continued

Examples of millimeter wave bands

| Bands [GHz] | Frequency [GHz] | Bandwidth [GHz] |
|---|---|---|
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum. The duplexing schemes used in the sub-7 GHz spectrum, among others, can be time division duplexing (TDD), frequency division duplexing (FDD), supplemental downlink (SDL) or supplemental uplink (SUL).

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The Fourth Generation Long Term Evolution (4G LTE) system and local area network (LAN) standard called Wi-Fi use orthogonal frequency-division multiplexing (OFDM) for encoding digital data on multiple carrier frequencies. A large number of closely spaced orthogonal sub-carriers are modulated with conventional modulation schemes such as BPSK, QPSK, 16-QAM, 64-QAM and 256-QAM. The next generation of wireless WAN standard referred to as 5G New Radio (NR) also uses orthogonal frequency-division multiplexing (OFDM).

SUMMARY

According to disclosed embodiments, a method of wireless communication using time division duplex over widely spaced frequency bands by a radio base station includes transmitting millimeter wave band downlink signals comprising a plurality of first transmission time intervals (TTIs) and receiving millimeter wave band uplink signals comprising at least one second TTI. The method includes switching from transmitting the millimeter wave band downlink signals to receiving the millimeter wave band uplink signals during a first switching time interval separating the first TTIs and the second TTI, and wherein the radio base station transmits the millimeter wave band downlink signals and receives the millimeter wave band uplink signals using asymmetric time division duplex, and wherein the number of first TTIs is greater than the number of second TTIs. The method includes transmitting sub-7 GHz band downlink signals comprising at least one third TTI and receiving sub-7 GHz band uplink signals comprising a plurality of fourth TTIs. The method includes switching from transmitting the sub-7 GHz band downlink signals to receiving the sub-7 GHz band uplink signals during a second switching time interval separating the third TTIs and the fourth TTIs, and wherein the radio base station transmits sub-7 GHz wave band downlink signals and receives sub-7 GHz band uplink signals using asymmetric time division duplex, and wherein the number of third TTIs is less than the number of fourth TTIs.

According to some disclosed embodiments, the bandwidth of the millimeter wave band signals is greater than the bandwidth of the sub-7 GHz band signals, and the sub-carrier spacing of the millimeter wave band signals is greater than the sub-carrier spacing of the sub-7 GHz band signals.

According to some disclosed embodiments, the bandwidth of the millimeter wave band signals is within a range of 100-400 MHz, and the bandwidth of the sub-7 GHz band signals is 100 MHz or less.

According to some disclosed embodiments, the sub-carrier spacing of the millimeter wave band signals is within a range of 120 KHz-480 KHz, and the sub-carrier spacing of the sub-7 GHz signals is within a range of 15 KHz-60 KHz.

According to disclosed embodiments, a method of wireless communication using time division duplex over widely spaced frequency bands by a radio base station includes transmitting millimeter wave band downlink signals comprising a plurality of first transmission time intervals (TTIs). The method includes transmitting sub-7 GHz band downlink signals comprising at least one second TTI and receiving sub-7 GHz band uplink signals comprising a plurality of third TTIs. The method includes switching from transmitting the sub-7 GHz band downlink signals to receiving the sub-7 GHz band uplink signals during a switching time interval separating the second TTIs and the third TTIs, and wherein the radio base station transmits sub-7 GHz wave band downlink signals and receives sub-7 GHz band uplink signals using asymmetric time division duplex, and wherein the number of second TTIs is less than the number of third TTIs.

According to disclosed embodiments, a method of wireless communication using time division duplex over widely spaced frequency bands by a plurality of radio base stations includes transmitting by a first radio base station millimeter wave band downlink signals comprising a plurality of first transmission time intervals (TTIs) and receiving by the first radio base station millimeter wave band uplink signals comprising at least one second TTI. The method includes switching by the first radio base station from transmitting the millimeter wave band downlink signals to receiving the millimeter wave band uplink signals during a first switching time interval separating the first TTIs and the second TTI, and wherein the first radio base station transmits the millimeter wave band downlink signals and receives the millimeter wave band uplink signals using asymmetric time division duplex, and wherein the number of first TTIs is greater than the number of second TTIs. The method includes transmitting by the first radio base station sub-7 GHz band downlink signals comprising at least one third TTI and receiving by the first radio base station sub-7 GHz band uplink signals comprising a plurality of fourth TTI. The method includes switching by the first radio base station from transmitting the sub-7 GHz band downlink signals to receiving the sub-7 GHz band uplink signals during a second switching time interval separating the third TTIs and the fourth TTIs, and wherein the first radio base station transmits sub-7 GHz wave band downlink signals and receives sub-7 GHz band uplink signals using asymmetric time division duplex, and wherein the number of third TTIs is less than the number of fourth TTIs. The method includes transmitting by a second radio base station millimeter wave band downlink signals comprising a plurality of the first transmission time intervals (TTIs) and receiving by the second radio base station millimeter wave band uplink signals comprising the at least one second TTI. The method includes switching by the second radio base station from transmitting the millimeter wave band downlink signals to receiving the millimeter wave band uplink signals during a third switching time interval separating the first TTIs and the second TTI, and wherein the second radio base station transmits the millimeter wave band downlink signals and receives the millimeter wave band uplink signals using asymmetric time division duplex, and wherein the number of first TTIs is greater than the number of second TTIs. The method includes transmitting by the second radio base station sub-7 GHz band downlink signals comprising the at least one third TTI and receiving by the second radio base station sub-7 GHz band uplink signals comprising a plurality of the fourth TTIs. The method includes switching by the second radio base station from transmitting the sub-7 GHz band downlink signals to receiving the sub-7 GHz band uplink signals during a fourth switching time interval separating the third TTIs and the fourth TTIs, and wherein the second radio base station transmits sub-7 GHz wave band downlink signals and receives sub-7 GHz band uplink signals using asymmetric time division duplex, and wherein the number of third TTIs is less than the number of fourth TTIs.

According to some disclosed embodiments, the first and third switching time intervals are concurrent, and the second and fourth switching time intervals are concurrent.

According to some disclosed embodiments, the first and second switching time intervals are concurrent, and the third and fourth switching time intervals are concurrent.

According to some disclosed embodiments, the first and second switching time intervals are non-concurrent, and the third and fourth switching time intervals are non-concurrent.

DETAILED DESCRIPTION

Figure 1:
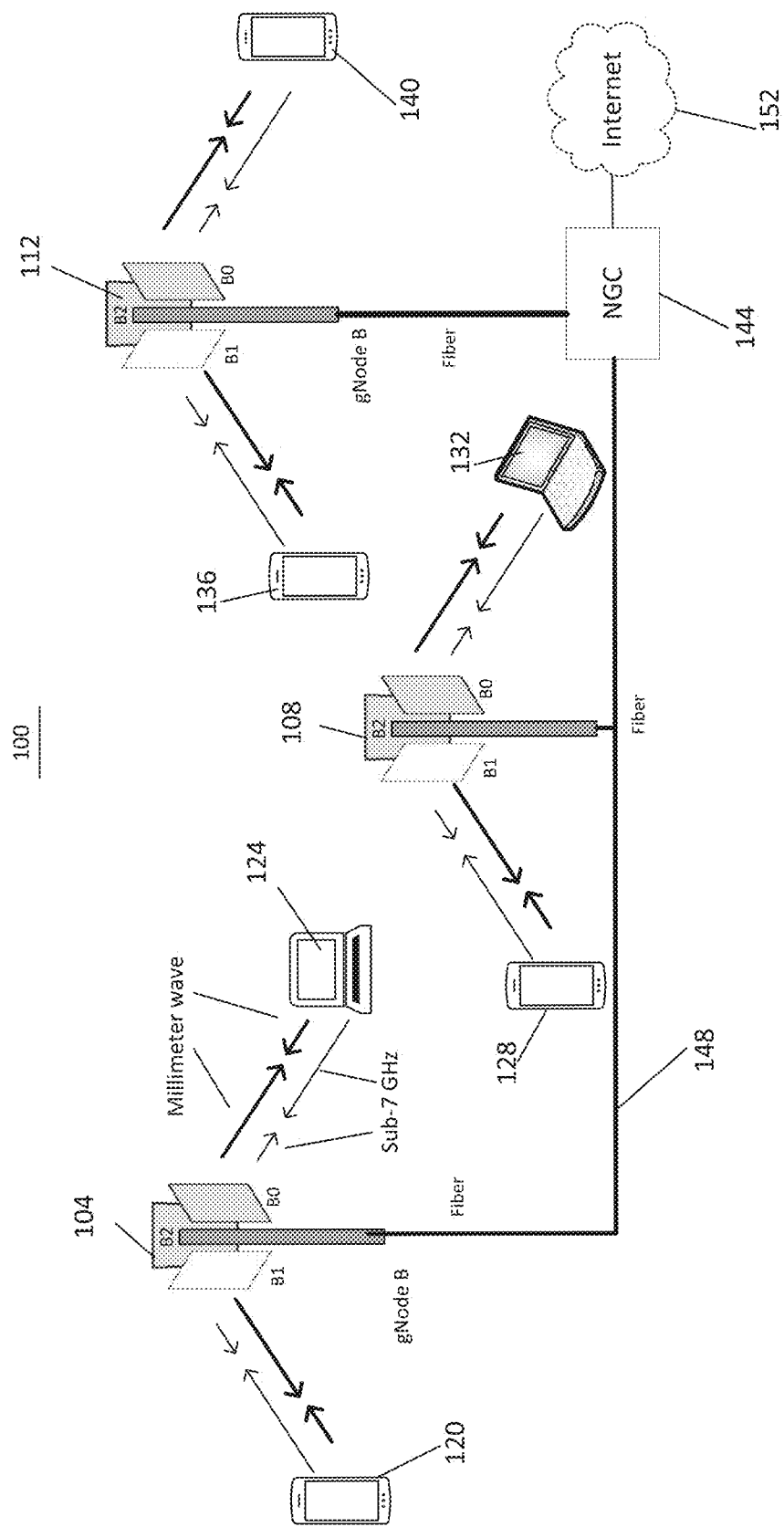
FIG. 1 illustrates a wireless communication system in accordance with disclosed embodiments.

FIG. 1 illustrates a wireless system 100 in accordance with disclosed embodiments. The wireless system 100 uses both millimeter wave spectrum above 24 GHz and sub-7 GHz spectrum in an asymmetric time division duplexing (TDD) configuration. In the asymmetric TDD configuration, in the millimeter wave spectrum above 24 GHz, the wireless system 100 uses a downlink-heavy TDD configuration where downlink periods for communication from the base station to the devices are longer compared to the uplink periods for communication from the devices to the base station, while in the sub-7 GHz spectrum, the wireless system 100 uses an uplink-heavy TDD configuration where the uplink periods for communication from the devices to the base station are longer compared to the downlink periods for communication from the base station to the devices.

The wireless communication system disclosed in this patent application that uses both millimeter wave spectrum above 24 GHz and sub-7 GHz in an asymmetric time division duplex (TDD) is referred to as the "Khan Asymmetric Wireless System", named after its inventor Dr. Farooq Khan, the named inventor of this patent application.

The asymmetric time division duplex (TDD) wireless communication method wherein in the millimeter wave spectrum downlink periods from the base station to communication devices are longer compared to the uplink periods from the communication devices to the base station, and wherein in the sub-7 GHz spectrum the uplink periods from the communication devices to the base station are longer compared to the downlink periods from the base station to the devices is referred to as the "Khan Asymmetric Wireless Communication Method", named after its inventor Dr. Farooq Khan, the named inventor of this patent application.

In yet other disclosed embodiments and in accordance with the principles of the Khan Asymmetric Wireless Communication Method, the bandwidth of the millimeter wave band signals is greater than the bandwidth of the sub-7 GHz band signals, and the sub-carrier spacing of the millimeter wave band signals is greater than the sub-carrier spacing of the sub-7 GHz band signals.

Referring to FIG. 1, the wireless system 100 includes radio base stations 104, 108 and 112 (also referred to as gNode Bs) that communicate with communication devices 120, 124, 128, 132, 136 and 140 on both millimeter wave spectrum frequency and sub-7 GHz spectrum frequency. The radio base stations gNode Bs 104, 108 and 112 are connected to a network 144 (e.g., Next Generation Core (NGC) network) using a communication link 148 (e.g., high-speed Fiber backhaul link). The network 144 may be connected to the Internet 152. The radio base station 104 serves communication devices 120 and 124, the radio base station 108 serves communication devices 128 and 132, and the radio base station 112 serves communication devices 136 and 140. The communication devices may, for example, be smartphones, laptop computers, desktop computers, augmented reality/virtual reality (AR/VR) devices or any other communication devices.

Figure 2A:
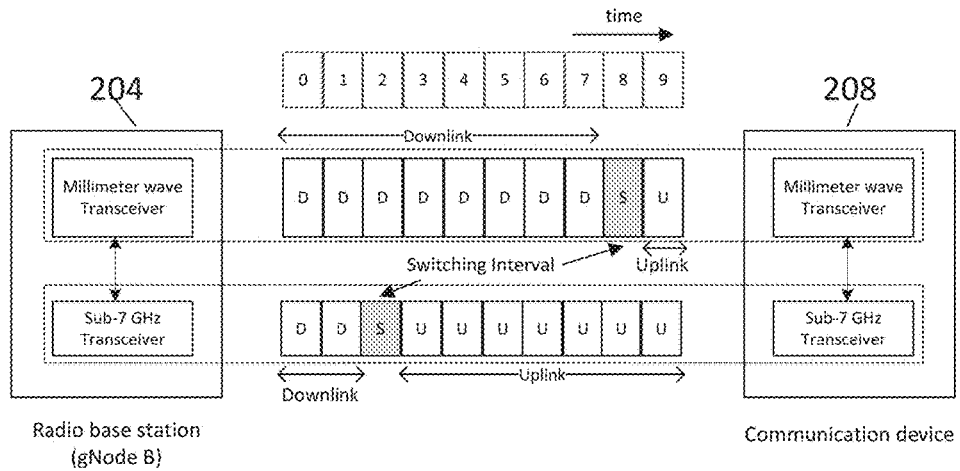
FIG. 2A-2C illustrate asynchronous TDD according to disclosed embodiments.

FIG. 2A illustrates a radio base station 204 and a communication device 208 communicating in an asynchronous TDD configuration according to some disclosed embodiments. A radio frame comprising 10 transmission time intervals (TTIs) numbered 0 to 9 is used for communication between the base station 204 and the communication device 208 using both millimeter wave spectrum above 24 GHz and sub-7 GHz spectrum. In the millimeter wave spectrum, 8 of the 10 TTIs numbered 0 to 7 are used for downlink communication from the base station 204 to the communication device 208, one of the TTIs numbered 8 is reserved for switching time from the downlink to uplink while a single TTI numbered 9 is used for uplink communication from the communication device 208 to the base station 204. Thus, the system uses a downlink-heavy TDD configuration where downlink periods for communication from the base station to the devices are longer compared to the uplink periods for communication from the devices to the base station. In the sub-7 GHz spectrum, the system uses an uplink-heavy TDD configuration where 2 of the 10 TTIs numbered 0 to 1 are used for downlink communication from the base station to the communication device, one of the TTIs numbered 2 is reserved for switching time from the downlink to uplink while a 7 TTIs numbered 3 to 9 are used for uplink communication from the communication device to the base station.

Figure 2B:
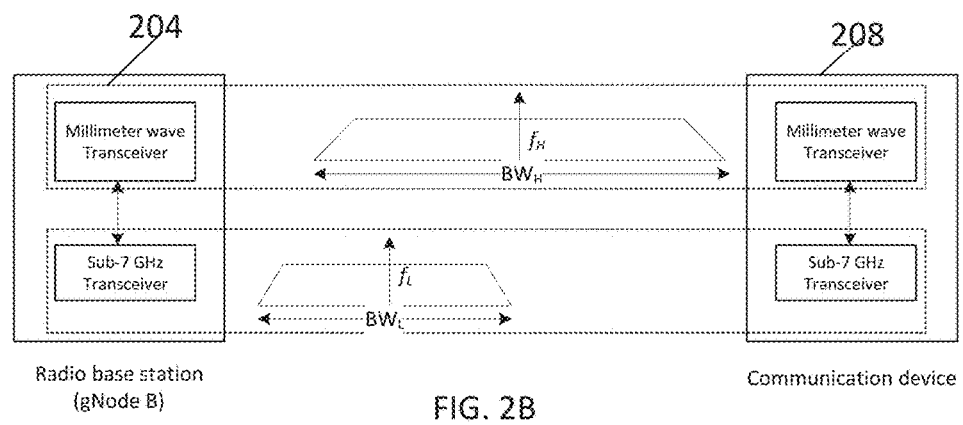
Figure 2C:
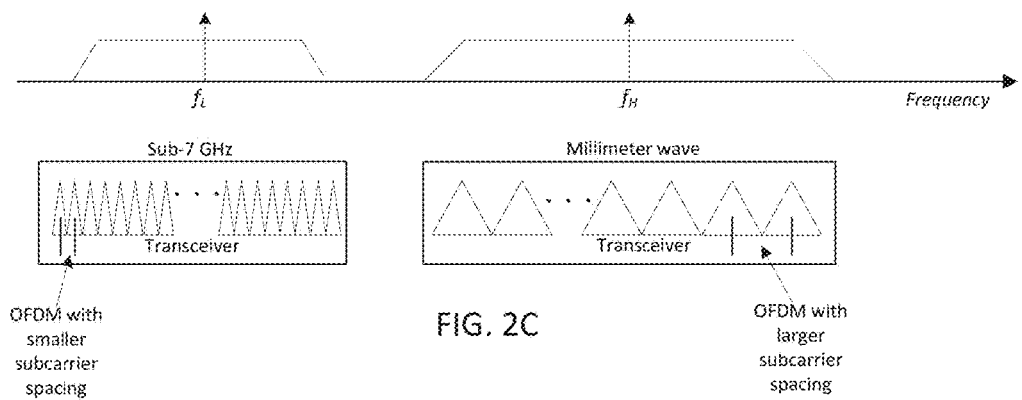

FIG. 2B and FIG. 2C illustrate frequency-domain views of the communication between the radio base station 204 and the communication device 208 using both millimeter wave spectrum above 24 GHz and sub-7 GHz spectrum according to some disclosed embodiments. In the millimeter wave spectrum, a downlink-heavy TDD configuration uses larger bandwidth such as 100-400 MHz and larger OFDM subcarrier spacing such as 120 KHz-480 KHz range for transmissions centered at a higher millimeter wave frequency $f_H$. In the sub-7 GHz spectrum, the system uses an uplink-heavy TDD configuration using bandwidth of 100 MHz or smaller and smaller OFDM subcarrier spacing in the 15 KHz-60 KHz range for transmissions centered at a sub-7 GHz frequency $f_L$.

Figure 3:
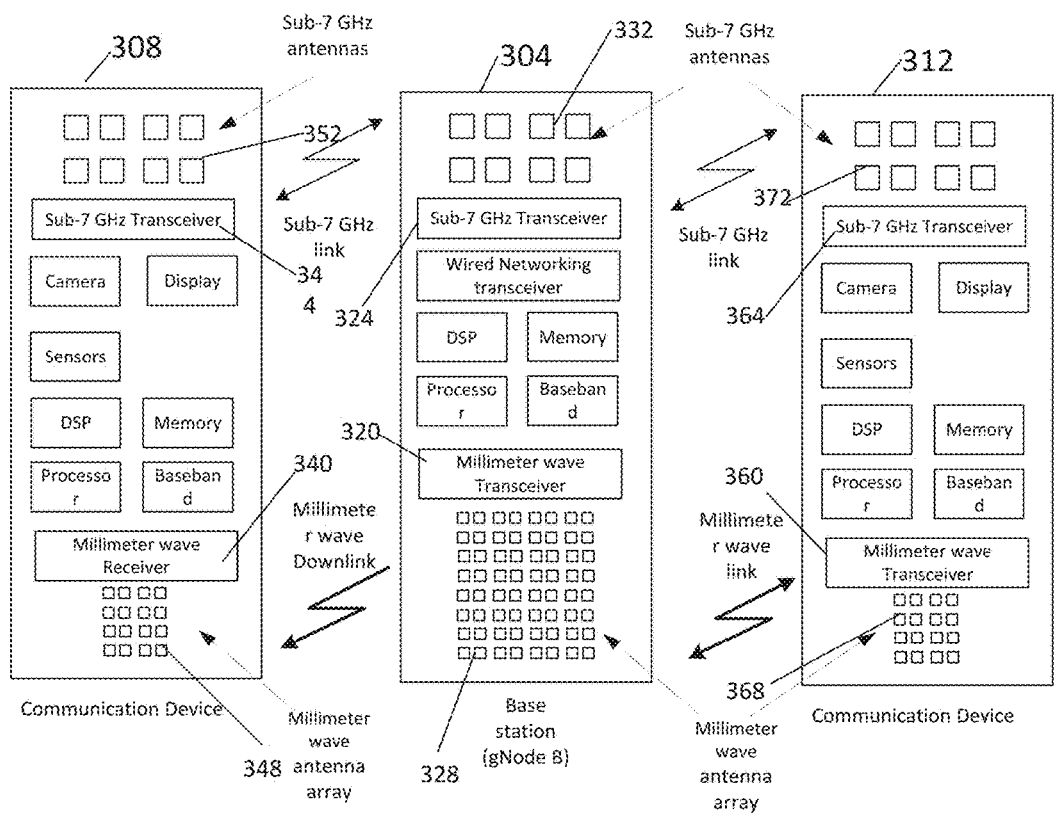
FIG. 3 illustrates block diagrams of a radio base station and communication devices.

FIG. 3 is a functional block diagram of a radio base station 304 and communication devices 308 and 312 in accordance with some disclosed embodiments. The radio base station 304 includes a millimeter wave transceiver 320 for signal transmissions and receptions to and from the communication device 312 and for signal transmission to the communication device 308 over the millimeter wave spectrum. The radio base station 304 also includes a sub-7 GHz transceiver 324 for transmitting and receiving signals to and from the communication devices 308 and 312 over the sub-7 GHz spectrum. The radio base station 304 further includes a millimeter wave antenna array 328 at one or more of the millimeter wave bands such as 26, 28, 37 and 39 GHz bands for signal transmission and reception over the millimeter wave spectrum and a sub-7 GHz antenna array 332 at one or more of the sub-7 GHz bands such as 3.5-4.2 GHz licensed or 5 GHz unlicensed bands for signal transmission and reception over the sub-7 GHz spectrum. The radio base station 304 may also include a baseband processor, a digital signal processor (DSP), a communications protocol processor, a memory, and networking and routing modules.

The communication device 308 includes a millimeter wave receiver 340 for receiving millimeter wave signals from the radio base station 304 and a sub-7 GHz transceiver 344 for transmitting and receiving signals in the sub-7 GHz spectrum to and from the radio base station 304. The communication device 308 also includes a millimeter wave antenna array 348 at one or more of the millimeter wave bands such as 26, 28, 37 and 39 GHz bands for signal reception from the radio base station 304 over the millimeter wave spectrum and a sub-7 GHz antenna array 352 at one or more of the sub-7 GHz bands such as 3.5-4.2 GHz licensed or 5 GHz unlicensed bands for signal transmission and reception to and from the radio base station 304 over the sub-7 GHz spectrum. The communication device 308 may also include a baseband processor, a digital signal processor (DSP), a communications protocol processor, a memory and networking components. The communication device may further include additional functionalities such as various sensors, a display and a camera.

The communication device 312 includes a millimeter wave transceiver 360 for transmitting and receiving millimeter wave signals to and from the radio base station 304 and a sub-7 GHz transceiver 364 for transmitting and receiving signals in the sub-7 GHz spectrum to and from the radio base station 304. The communication device 312 also includes a millimeter wave antenna array 368 at one or more of the millimeter wave bands such as 26, 28, 37 and 39 GHz bands for signal reception from the radio base station 304 over the millimeter wave spectrum and a sub-7 GHz antenna array 372 at one or more of the sub-7 GHz bands such as 3.5-4.2 GHz licensed or 5 GHz unlicensed bands for signal transmission and reception to and from the radio base station 304 over the sub-7 GHz spectrum. The communication device 308 may also include a baseband processor, a digital signal processor (DSP), a communications protocol processor, a memory and networking components. The communication device 308 may further include additional functionalities such as various sensors, a display and a camera.

Figure 4:
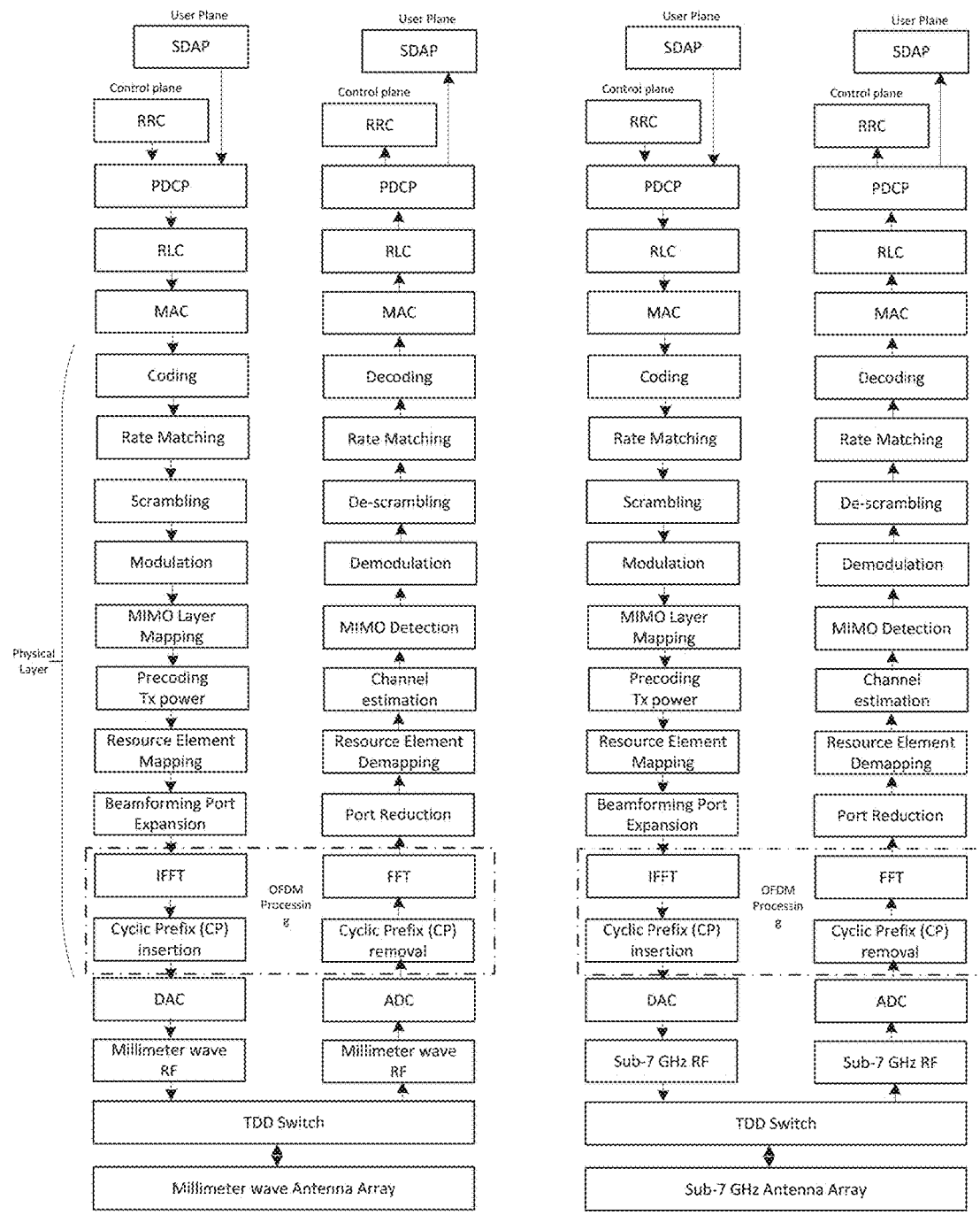
FIG. 4 illustrates block diagrams of transceivers.

FIG. 4 is a block diagram of a millimeter wave transceiver 404 and a sub-7 GHz transceiver 408 according to some disclosed embodiments. The millimeter wave transceiver 404 and a sub-7 GHz transceiver 408 include a physical layer, a Medium Access Control (MAC) layer, a Radio Link Control (RLC) layer, and a Packet Data Convergence Protocol (PDCP) layer, and a Service Data Adaptation Protocol (SDAP) layer in both the transmit and receive chains. The control plane for both millimeter wave transceiver 404 and a sub-7 GHz transceiver 408 includes a Radio Resource Control (RRC) on top of the PDCP layer in both the transmit and receive chains. The millimeter wave transceiver 404 also includes a millimeter wave antenna array and a TDD switch to switch between the transmit and receive time intervals on millimeter wave bands such as 26, 28, 37 and 39 GHz bands. The sub-7 GHz transceiver 408 also includes a sub-7 GHz antenna array and a TDD switch to switch between the transmit and receive time intervals on sub-7 GHz spectrum such as 3.5-4.2 GHz licensed or 5 GHz unlicensed bands.

According to some disclosed embodiments, OFDM processing is done as part of the physical layer before digital-to-analog (DAC) conversion in the transmit chains and after analog-to-digital conversion (ADC) in the receive chains. As part of the OFDM processing at the transmitter, an Inverse Fast Fourier Transform (IFFT) operation is performed and a cyclic prefix (CP) is added to the transformed symbols. As part of the OFDM processing at the receiver, a cyclic prefix (CP) is removed and a Fast Fourier Transform (FFT) operation is performed to generate the modulation symbols. The number of sub-carriers in an OFDM system is equal to the IFFT/FFT size. For a fixed total bandwidth, a larger IFFT/FFT size generates a smaller sub-carrier spacing while a smaller IFFT/FFT size will generate a larger sub-carrier spacing. Therefore, the sub-carrier spacing can be adjusted by changing the size of the IFFT/FFT.

Figure 5:
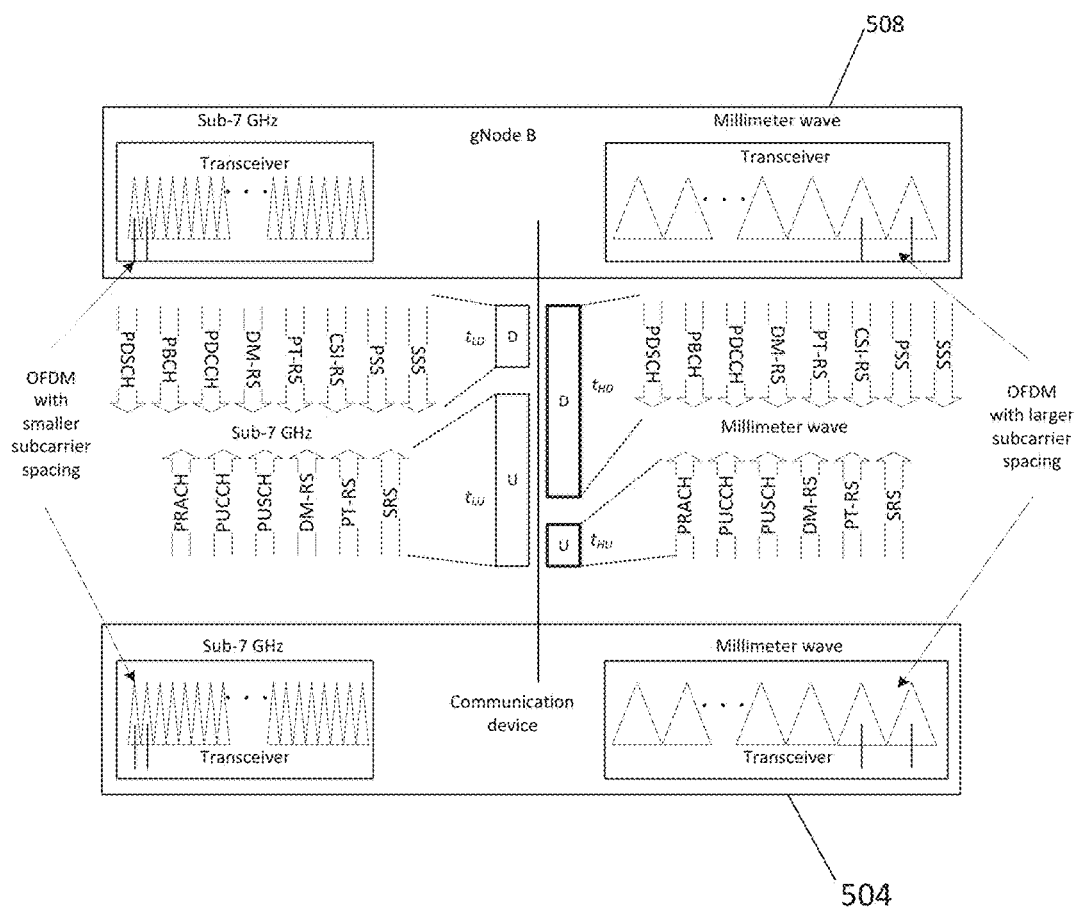
FIG. 5 illustrates physical channels and signals.

FIG. 5 illustrates uplink physical channels and uplink physical signals transmission and reception, and downlink physical channels and downlink physical signals transmission and reception according to some disclosed embodiments. An uplink physical channel corresponds to a set of resource elements carrying information originating from higher layers. The uplink physical channels transmitted from a communication device 504 and received by a radio base station 508 include: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device 504 and received by the radio base station 508 on include: Demodulation reference signals (DM-RS), Phase-tracking reference signals (PT-RS) and Sounding reference signal (SRS). The TDD transmission interval for transmission of uplink physical channels and uplink physical signals by the communication devices on millimeter wave spectrum such as 26, 28, 37 and 39 GHz bands denoted as $t_{HU}$ is smaller compared to TDD transmission interval for transmission of uplink physical channels and uplink physical signals by the communication devices on sub-7 GHz spectrum such as 3.5-4.2 GHz licensed or 5 GHz unlicensed bands denoted as $t_{LU}$, that is, $t_{HU} < t_{LU}$.

A downlink physical channel corresponds to a set of resource elements carrying information originating from higher layers. The downlink physical channels transmitted from the radio base station 508 and received by the communication device 504 include: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station 508 and received by the communication device 504 include: Demodulation reference signals (DM-RS), Phase-tracking reference signals (PT-RS) Channel-state information reference signal (CSI-RS) Primary synchronization signal (PSS) and Secondary synchronization signal (SSS). The TDD transmission interval for transmission of downlink physical channels and downlink physical signals by the radio base station on millimeter wave spectrum such as 26, 28, 37 and 39 GHz bands denoted as $t_{HD}$ is larger compared to TDD transmission interval for transmission of downlink physical channels and downlink physical signals by the radio base station on sub-7 GHz spectrum such as 3.5-4.2 GHz licensed or 5 GHz unlicensed bands denoted as $t_{LD}$, that is, $t_{HD} > t_{LD}$.

Figure 6:
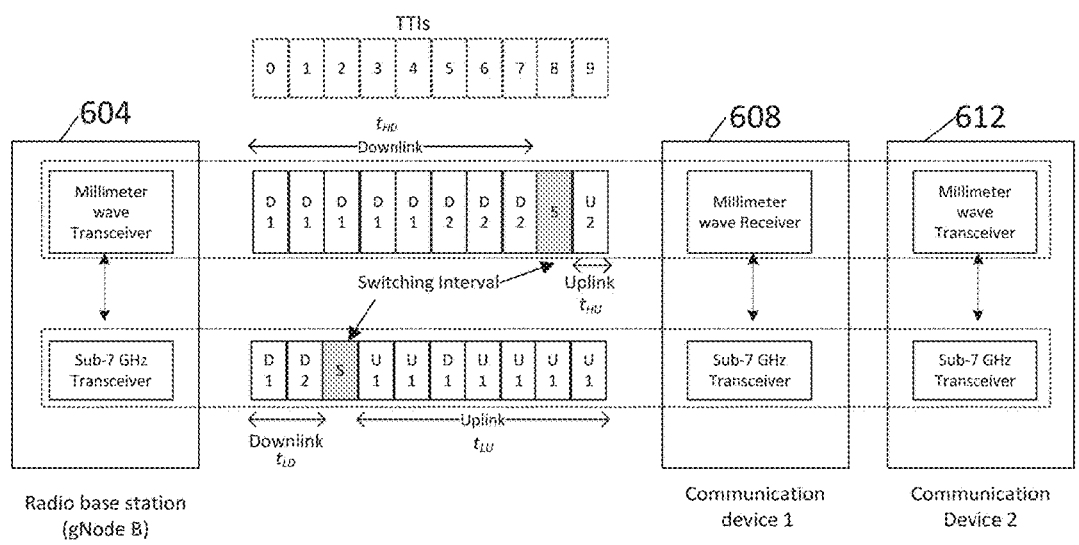
FIG. 6 illustrates communication between a radio base station and communication devices.

FIG. 6 illustrates communication between a radio base station 604 and communication devices 608 and 612 according to some disclosed embodiments. The radio base station 604, also referred to as gNode B, transmits and receive signals on both millimeter wave spectrum and sub-7 GHz spectrum. The communication device 608 implements a millimeter wave receiver for receiving millimeter wave spectrum signals from the radio base station 604 but does not implement a millimeter wave transmitter. The communication device 608 also implements a sub-7 GHz spectrum transceiver to transmit signals to and receive signals from the radio base station 604 on the sub-7 GHz spectrum. The communication device 612 implements both a millimeter wave transceiver and a sub-7 GHz spectrum transceiver for transmitting to and receiving from the radio base station 604 both the millimeter wave and sub-7 GHz signals.

On the millimeter wave spectrum such as, for example, 26, 28, 37 and 39 GHz bands, the radio base station 604 transmits millimeter wave data signals to the communication device 608 on transmission time intervals (TTIs) 0-4 and to the communication device 612 on transmission time intervals (TTIs) 5-7. The transmission time interval (TTI) number 8 labeled "S" is used for switching from downlink intervals to uplink intervals. In the transmission time interval (TTI) number 9, the communication device 612 transmits data or control signals on millimeter wave spectrum such as 26, 28, 37 and 39 GHz bands.

On sub-7 GHz spectrum such as 3.5-4.2 GHz licensed or 5 GHz unlicensed bands, the radio base station 604 transmits data or control signals to the communication device 608 on TTI number 0 and to the communication device 612 on TTI number 1. The transmission time interval (TTI) number 2 labeled "S" is used for switching from downlink intervals to uplink intervals. TTI numbered 3, 4, 6, 7, 8 and 9 are used by the communication device 608 to transmit data or control signals to the radio base station 604. TTI numbered 5 is used by the communication device 612 to transmit data or control signals to the radio base station 604.

The TDD transmission interval for transmission of downlink data or control signals by the radio base station 604 on millimeter wave spectrum such as 26, 28, 37 and 39 GHz bands denoted as $t_{HD}$ is larger compared to TDD transmission interval for transmission of downlink data or control signals by the radio base station 604 on sub-7 GHz spectrum such as 3.5-4.2 GHz licensed or 5 GHz unlicensed bands denoted as $t_{LD}$, that is, $t_{HD} > t_{LD}$. The TDD transmission interval for transmission of uplink data or control signals by the communication devices on millimeter wave spectrum such as 26, 28, 37 and 39 GHz bands denoted as $t_{HU}$ is smaller compared to TDD transmission interval for transmission of uplink data or control signals by the communication devices on sub-7 GHz spectrum such as 3.5-4.2 GHz licensed or 5 GHz unlicensed bands denoted as $t_{LU}$, that is, $t_{HU} < t_{LU}$.

Figure 7:
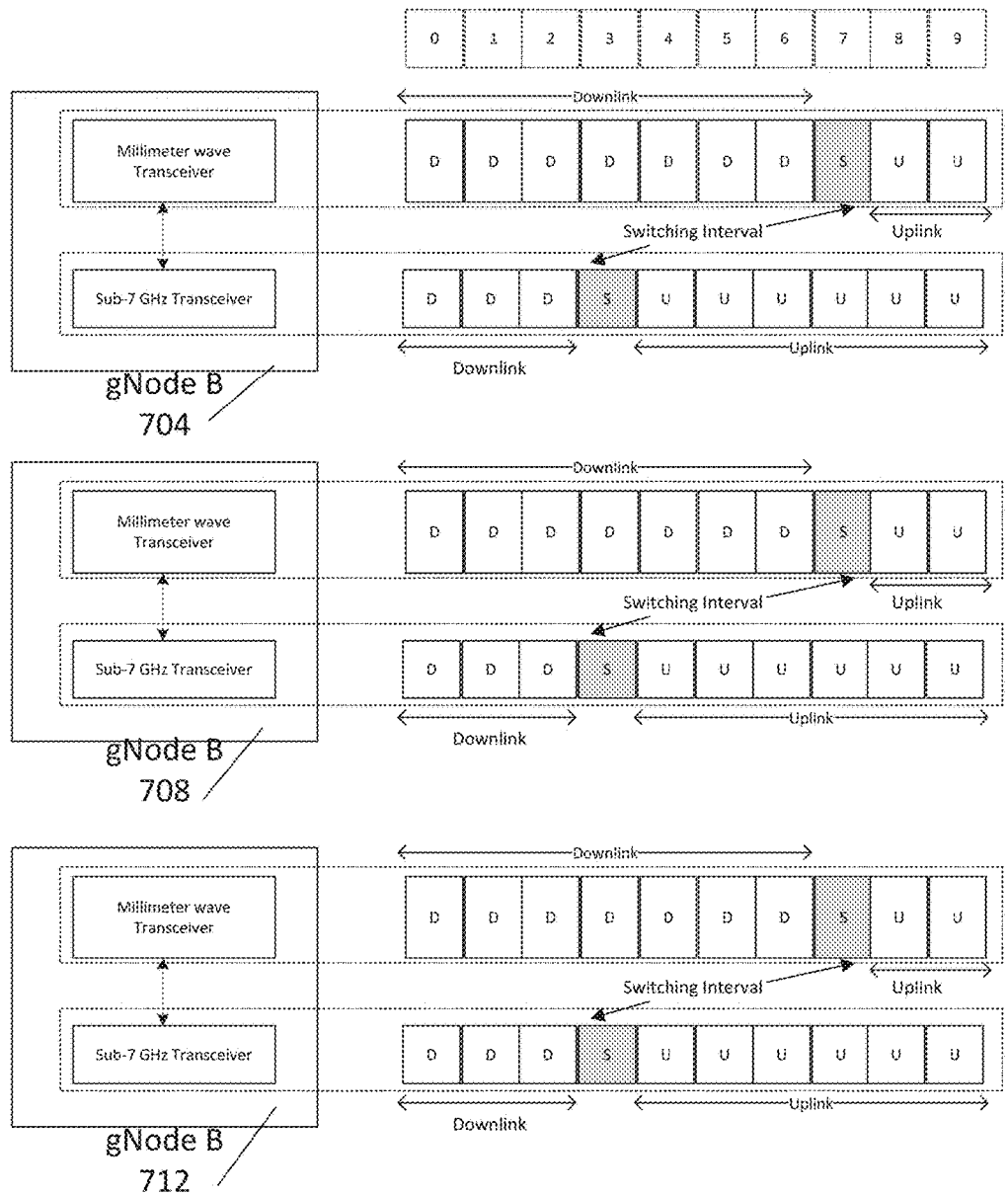
FIG. 7-10 illustrate switching points from downlink intervals to uplink intervals.

FIG. 7 illustrates the switching points labeled "S" for switching from downlink intervals to uplink intervals according to some disclosed embodiments. The switching points across the radio base stations 704, 708 and 712 on the millimeter wave spectrum such as 26, 28, 37 and 39 GHz bands are synchronized with each radio base station using TTI numbered 7 as the switching interval. The switching points across the radio base stations 704, 708 and 712 on the sub-7 GHz spectrum such as 3.5-4.2 GHz licensed or 5 GHz unlicensed bands are also synchronized with each radio base station using TTI numbered 3 as the switching interval.

Figure 8:
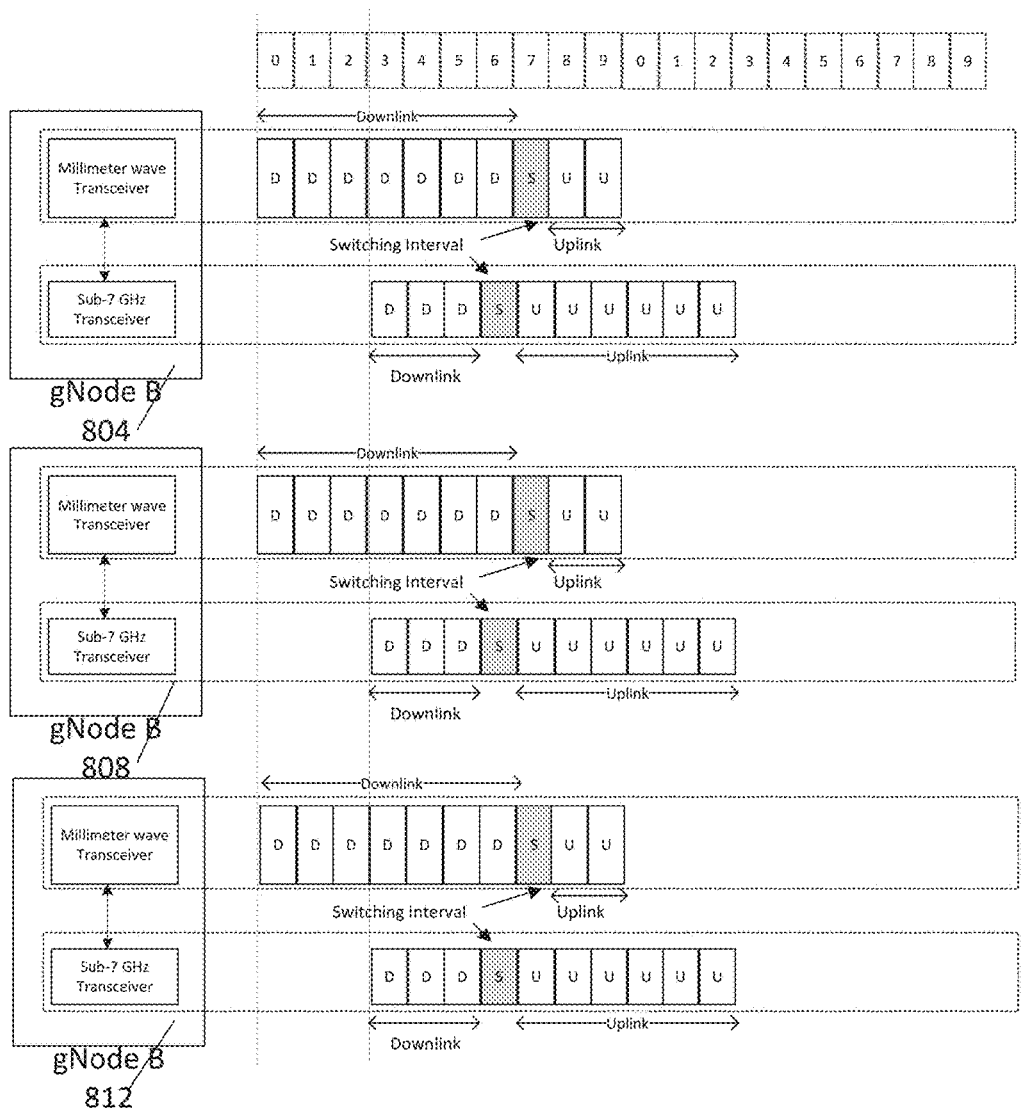

FIG. 8 illustrates the switching points labeled "S" for switching from downlink intervals to uplink intervals according to some disclosed embodiments. The switching points across the radio base stations 804, 808 and 812 on the millimeter wave spectrum such as, for example, 26, 28, 37 and 39 GHz bands are synchronized with each radio base station using TTI numbered 7 as the switching interval. The switching points across the radio base stations 804, 808 and 812 on the sub-7 GHz spectrum such as 3.5-4.2 GHz licensed or 5 GHz unlicensed bands are also synchronized with each radio base station using TTI numbered 6 as the switching interval.

Figure 9:
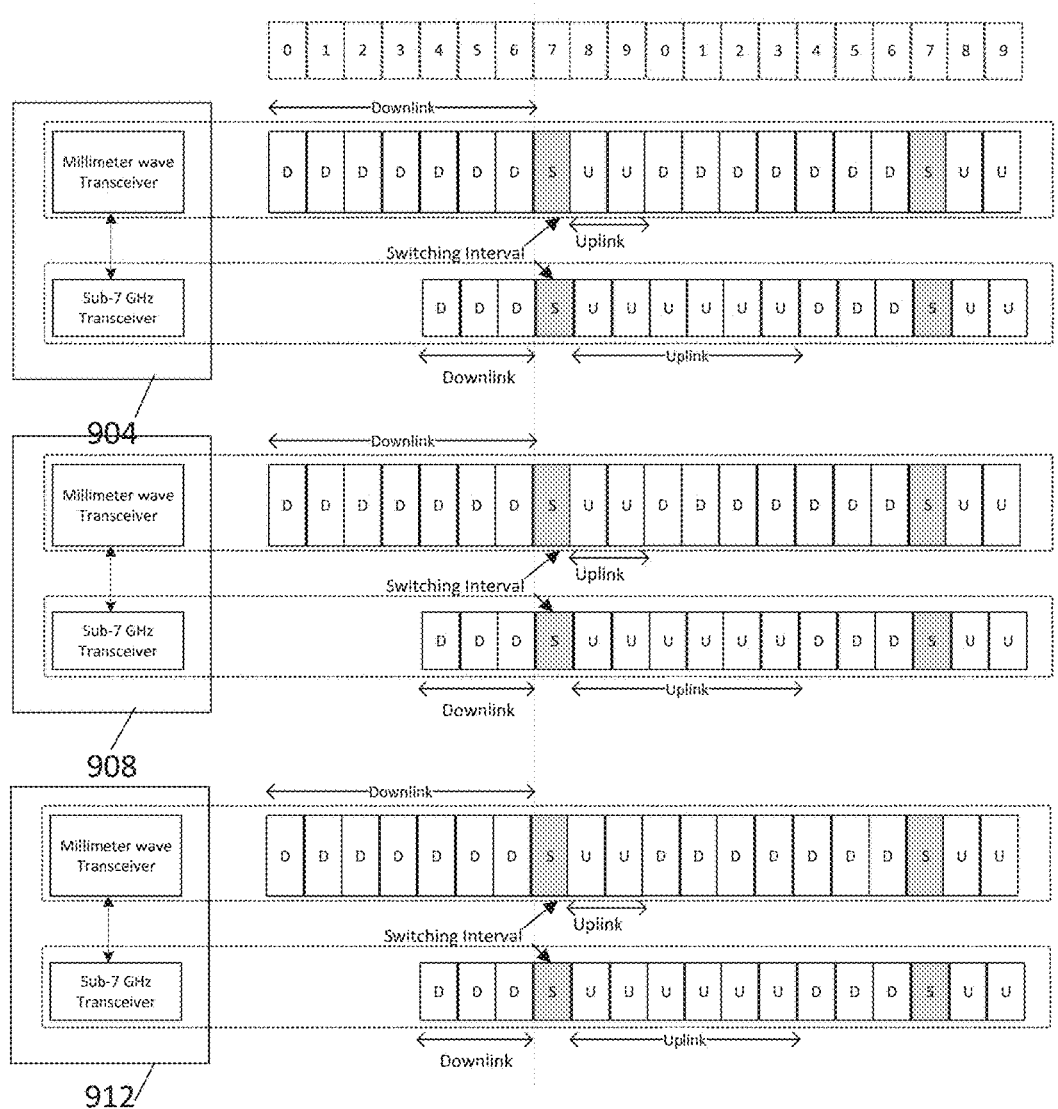

FIG. 9 illustrates the switching points labeled "S" for switching from downlink intervals to uplink intervals according to some disclosed embodiments. The switching points across the radio base station 904, 908 and 703 on the millimeter wave spectrum such as, for example, 26, 28, 37 and 39 GHz bands are synchronized with each radio base station using TTI numbered 7 as the switching interval. The switching points across the radio base stations 904, 908 and 912 on the sub-7 GHz spectrum such as, for example, 3.5-4.2 GHz licensed or 5 GHz unlicensed bands are also synchronized with each radio base station using TTI numbered 7 as the switching interval. In this example, switching points on millimeter wave spectrum such as, for example, 26, 28, 37 and 39 GHz bands are synchronized with the switching points on sub-7 GHz spectrum such as, for example, 3.5-4.2 GHz licensed or 5 GHz unlicensed bands with TTI numbered 7 used as the switching interval in both cases.

Figure 10:
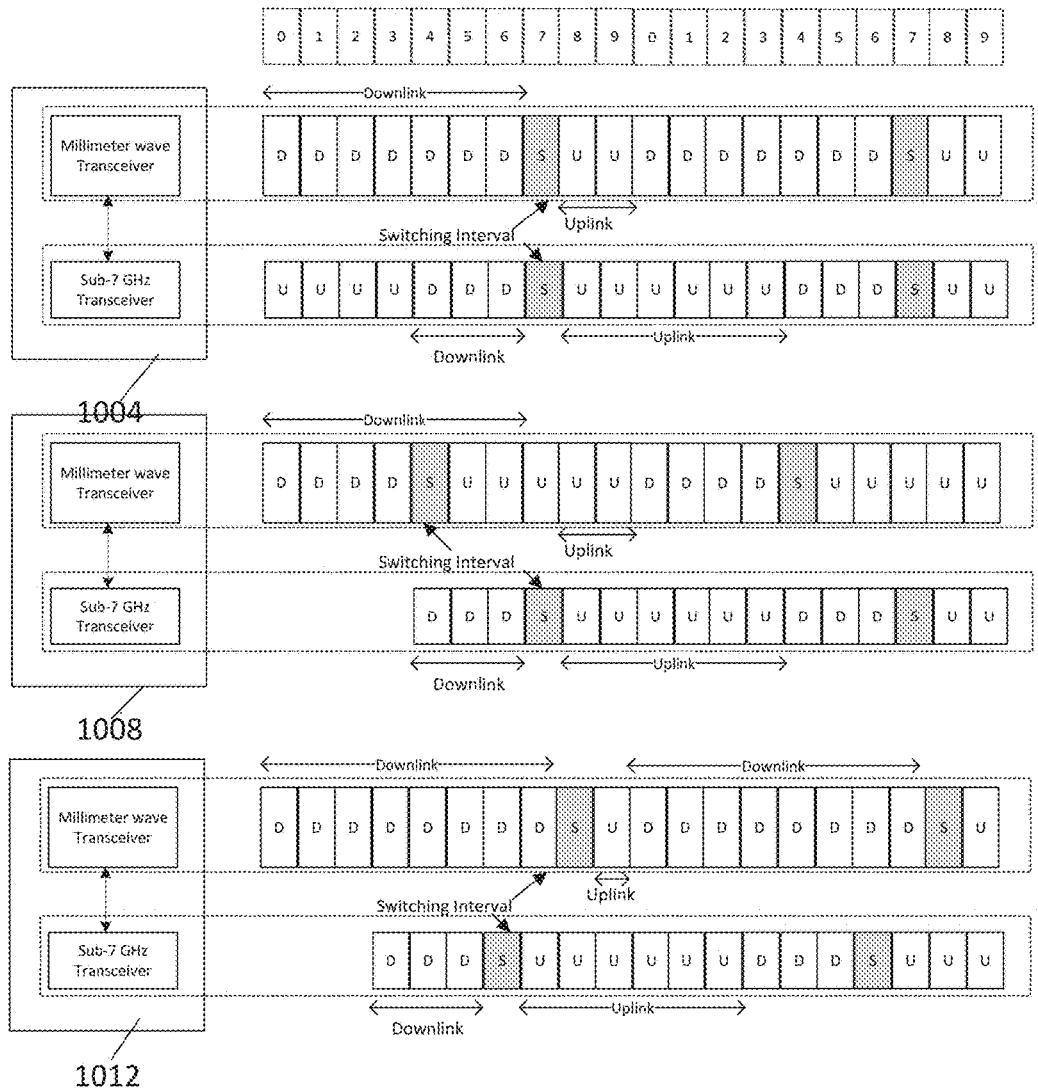

FIG. 10 illustrates the switching points labeled "S" for switching from downlink intervals to uplink intervals according to some disclosed embodiments. The switching points across the radio base stations 1004, 1008 and 1012 on the millimeter wave spectrum such as, for example, 26, 28, 37 and 39 GHz bands are not synchronized with each radio base station using possibly a different TTI as the switching interval. The switching points across the radio base stations 1004, 1008 and 1012 on the sub-7 GHz spectrum such as, for example, 3.5-4.2 GHz licensed or 5 GHz unlicensed bands are also not synchronized with each radio base station using possibly a different TTI as the switching interval.

Figure 11:
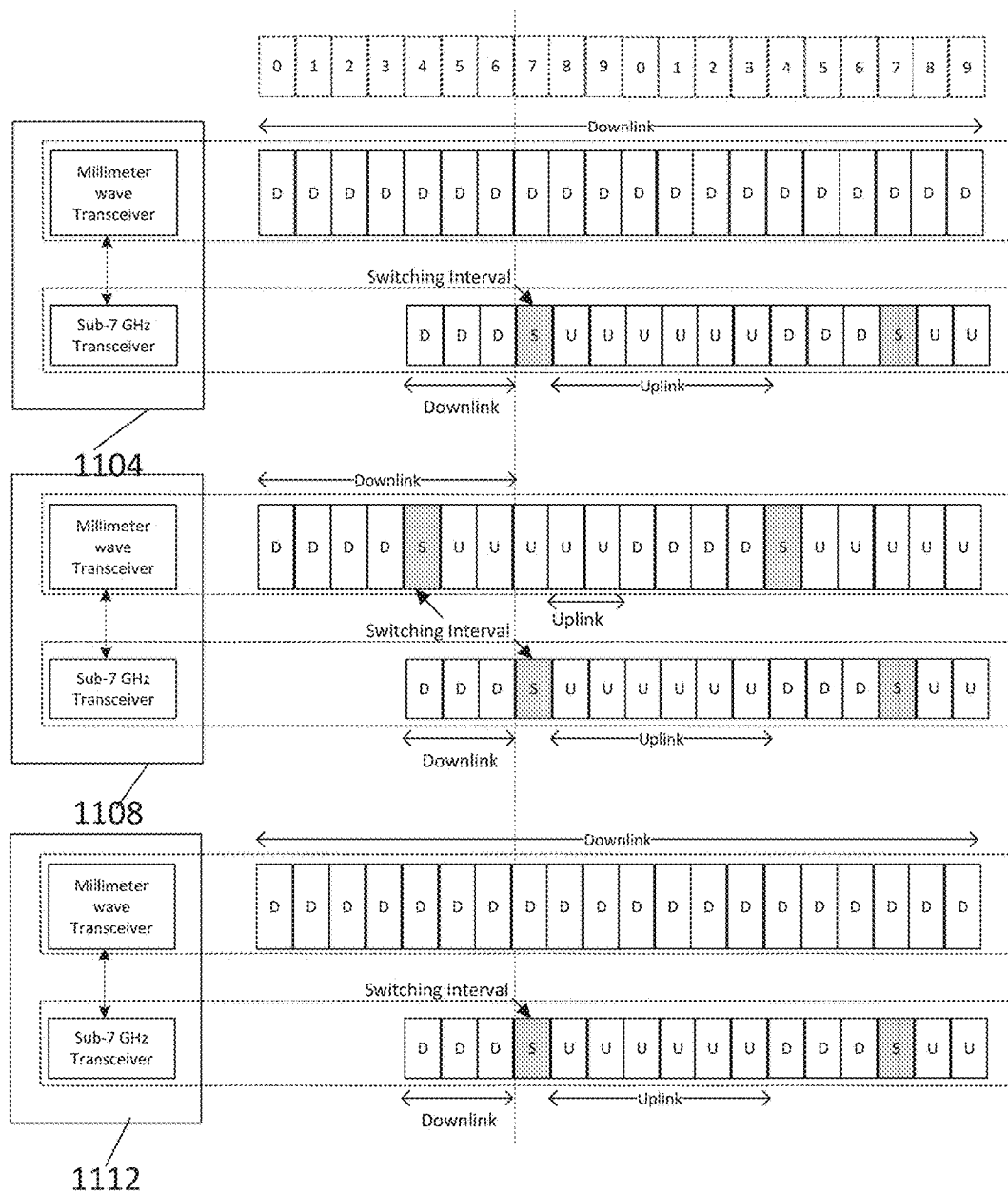
FIGS. 11-12 illustrate asynchronous TDD according to other disclosed embodiments.

FIG. 11 illustrates an exemplary embodiment wherein a radio base station 1104 uses all the TTIs for downlink transmissions on the millimeter wave spectrum such as 26, 28, 37 and 39 GHz bands while TTIs on the sub-7 GHz spectrum such as 3.5-4.2 GHz licensed or 5 GHz unlicensed bands are split between downlink and uplink TTIs. In contrast, radio base stations 1108 and 1112 use both the millimeter wave spectrum and the sub-7 GHz spectrum for both uplink and downlink, and thus the millimeter wave band spectrum and the sub-7 GHz spectrum are split between downlink and uplink TTIs.

In other embodiments, all the TTIs on the sub-7 GHz spectrum such as 3.5-4.2 GHz licensed or 5 GHz unlicensed bands can be used for the uplink.

Figure 12:
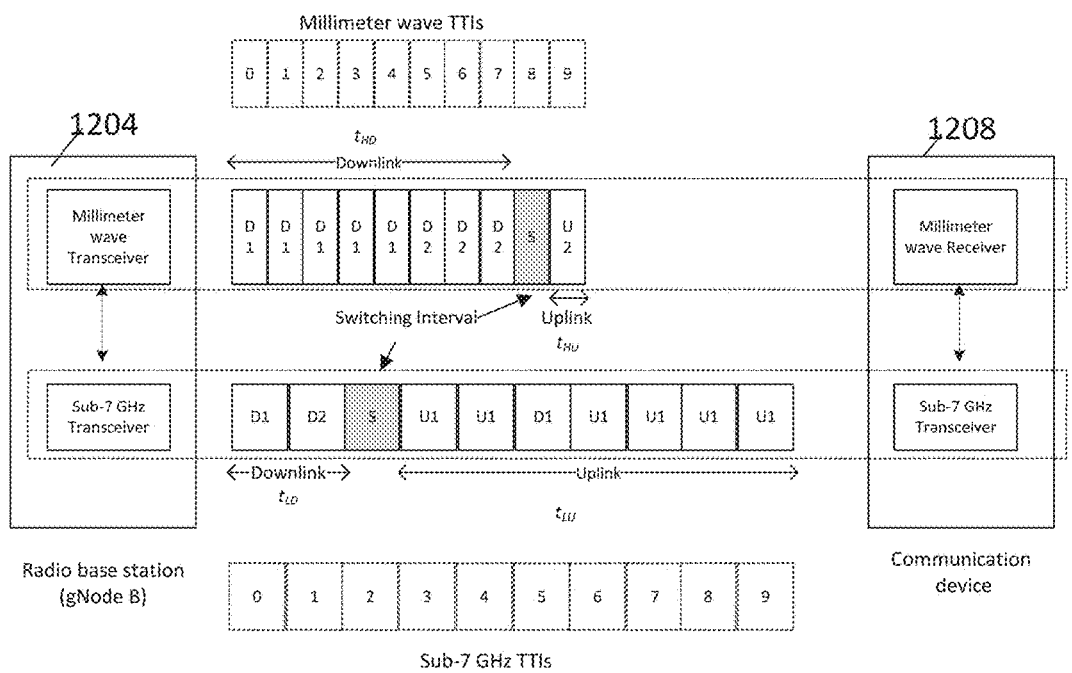

FIG. 12 illustrates communication between a radio base station 1204 and a communication device 1208 according to some disclosed embodiments. The transmission time intervals (TTIs) on millimeter wave spectrum such as, for example, 26, 28, 37 and 39 GHz bands are shorter compared to TTIs on sub-7 GHz spectrum such as, for example, 3.5-4.2 GHz licensed or 5 GHz unlicensed bands. On millimeter wave spectrum such as 26, 28, 37 and 39 GHz bands, a downlink-heavy TDD configuration with $t_{HD} > t_{HU}$ is used by the radio base station 1204 while on the sub-7 GHz spectrum such as 3.5-4.2 GHz licensed or 5 GHz unlicensed bands, an uplink-heavy TDD configuration with $t_{LD} < t_{LU}$ is used by the radio base station 1204. When TTIs are different between the millimeter wave spectrum such as 26, 28, 37 and 39 GHz bands and the sub-7 GHz spectrum such as 3.5-4.2 GHz licensed or 5 GHz unlicensed bands, asymmetric TDD can be represented as $$\frac{t_{HD}}{t_{HU}} > \frac{t_{LD}}{t_{LU}}.$$

In some disclosed embodiments, baseband functions are implemented in an application-specific integrated circuit (ASIC) system-on-a-chip (SoC). In other embodiments, these functions can be implemented on general-purpose processors or in field-programmable gate array (FPGA) integrated circuits.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A method of wireless communication using time division duplex over widely spaced frequency bands by a plurality of radio base stations, comprising:
   transmitting by a first radio base station millimeter wave band downlink signals comprising a plurality of transmission time intervals (TTIs);
   receiving by the first radio base station millimeter wave band uplink signals comprising at least one TTI;
   wherein the first radio base station transmits the millimeter wave band downlink signals and receives the millimeter wave band uplink signals using asymmetric time division duplex, and wherein the number of TTIs in the millimeter wave band downlink signals is greater than the number of TTIs in the millimeter wave band uplink signals;
   transmitting by the first radio base station sub-7 GHz band downlink signals comprising at least one TTI;
   receiving by the first radio base station sub-7 GHz band uplink signals comprising a plurality of TTIs;
   wherein the first radio base station transmits sub-7 GHz wave band downlink signals and receives sub-7 GHz band uplink signals using asymmetric time division duplex, and wherein the number of TTIs in the sub-7 GHz band downlink signals is less than the number of TTIs in the sub-7 GHz band uplink signals;
   transmitting by a second radio base station millimeter wave band downlink signals comprising a plurality of the transmission time intervals (TTIs);
   receiving by the second radio base station millimeter wave band uplink signals comprising the at least one TTI;
   wherein the second radio base station transmits the millimeter wave band downlink signals and receives the millimeter wave band uplink signals using asymmetric time division duplex, and wherein the number of TTIs in the millimeter wave band downlink signals is greater than the number of TTIs in the millimeter wave band uplink signals;
   transmitting by the second radio base station sub-7 GHz band downlink signals comprising the at least one TTI;
   receiving by the second radio base station sub-7 GHz band uplink signals comprising a plurality of TTIs;
   wherein the second radio base station transmits sub-7 GHz wave band downlink signals and receives sub-7 GHz band uplink signals using asymmetric time division duplex, and wherein the number of TTIs in the sub-7 GHz band downlink signals is less than the number of TTIs in the sub-7 GHz band uplink signals.

2. The method of claim 1, further comprising switching by the first radio base station from transmitting the millimeter wave band downlink signals to receiving the millimeter wave band uplink signals during a first switching time interval.

3. The method of claim 1, further comprising switching by the first radio base station from transmitting the sub-7 GHz band downlink signals to receiving the sub-7 GHz band uplink signals during a second switching time interval.

4. The method of claim 1, further comprising switching by the second radio base station from transmitting the millimeter wave band downlink signals to receiving the millimeter wave band uplink signals during a third switching time interval.

5. The method of claim 1, further comprising switching by the second radio base station from transmitting the sub-7 GHz band downlink signals to receiving the sub-7 GHz band uplink signals during a fourth switching time interval.

6. The method of claim 1, wherein the bandwidth of the millimeter wave band signals is greater than the bandwidth of the sub-7 GHz band signals.

7. The method of claim 1, wherein the sub-carrier spacing of the millimeter wave band signals is greater than the sub-carrier spacing of the sub-7 GHz band signals.

8. The method of claim 1, wherein the bandwidth of the millimeter wave band signals is between 100-400 MHz.

9. The method of claim 1, wherein the bandwidth of the sub-7 GHz band signals is 100 MHz or less.

10. The method of claim 1, wherein the sub-carrier spacing of the millimeter wave band signals is between 120 KHz 480 KHz.

11. The method of claim 1, wherein the sub-carrier spacing of the sub-7 GHz signals is between 15 KHz-60 KHz.

12. A method of wireless communication using time division duplex over widely spaced frequency bands by a plurality of radio base stations, comprising:
   transmitting by a first radio base station millimeter wave band downlink signals comprising a plurality of transmission time intervals (TTIs);
   transmitting by the first radio base station sub-7 GHz band downlink signals comprising at least one TTI;
   receiving by the first radio base station sub-7 GHz band uplink signals comprising a plurality of TTIs;
   switching by the first radio base station from transmitting the sub-7 GHz band downlink signals to receiving the sub-7 GHz band uplink signals during a first switching time interval, and wherein the first radio base station transmits sub-7 GHz band downlink signals and receives sub-7 GHz band uplink signals using asymmetric time division duplex, and wherein the number of TTIs in the sub-7 GHz band downlink signals is less than the number of TTIs in the sub-7 GHz band uplinks signals;
   transmitting by a second radio base station millimeter wave band downlink signals comprising a plurality of TTIs;
   receiving by the second radio base station millimeter wave band uplink signals comprising the at least one TTI;

switching by the second radio base station from transmitting the millimeter wave band downlink signals to receiving the millimeter wave band uplink signals during a second switching time interval, and wherein the second radio base station transmits the millimeter wave band downlink signals and receives the millimeter wave band uplink signals using asymmetric time division duplex, and wherein the number of TTIs in the sub-7 GHz band downlink signals is greater than the number of TTIs in the sub-7 GHz band uplink signals;

transmitting by the second radio base station sub-7 GHz band downlink signals comprising the at least one TTI;

receiving by the second radio base station sub-7 GHz band uplink signals comprising a plurality of TTIs;

switching by the second radio base station from transmitting the sub-7 GHz band downlink signals to receiving the sub-7 GHz band uplink signals during a third switching time interval, and wherein the second radio base station transmits sub-7 GHz wave band downlink signals and receives sub-7 GHz band uplink signals using asymmetric time division duplex, and wherein the number of TTIs in the sub-7 GHz band downlink signals is less than the number of TTIs in the sub-7 GHz band uplink signals.

13. The method of claim 12, wherein the second and third switching time intervals are concurrent.

14. The method of claim 12, wherein the second and third switching time intervals are non-concurrent.

15. The method of claim 12, wherein the first and second switching time intervals are concurrent.

16. The method of claim 12, wherein the first and second switching time intervals are non-concurrent.

17. The method of claim 12, wherein the first and second switching time intervals are non-concurrent.

18. The method of claim 12, wherein the bandwidth of the millimeter wave band signals is greater than the bandwidth of the sub-7 GHz band signals.

19. The method of claim 12, wherein the sub-carrier spacing of the millimeter wave band signals is greater than the sub-carrier spacing of the sub-7 GHz band signals.

20. The method of claim 12, wherein the bandwidth of the millimeter wave band signals is between 100-400 MHz.

21. The method of claim 12, wherein the bandwidth of the sub-7 GHz band signals is 100 MHz or less.

22. The method of claim 12, wherein the sub-carrier spacing of the millimeter wave band signals is between 120 KHz-480 KHz.

23. The method of claim 12, wherein the sub-carrier spacing of the sub-7 GHz signals is between 15 KHz-60 KHz.

* * * * *